United States Patent
Ruffa

(10) Patent No.: US 11,226,427 B1
(45) Date of Patent: Jan. 18, 2022

(54) LIFT-BASED ACOUSTIC SOURCE

(71) Applicant: The United States of America as represented by the Secretary of the Navy, Newport, RI (US)

(72) Inventor: Anthony A Ruffa, Hope Valley, RI (US)

(73) Assignee: The United States of America, as represented by the Secretary of the Navy

(*) Notice: Subject to any disclaimer, the term of this patent is extended or adjusted under 35 U.S.C. 154(b) by 85 days.

(21) Appl. No.: 16/815,055

(22) Filed: Mar. 11, 2020

(51) Int. Cl.
| | |
|---|---|
| *G01V 1/38* | (2006.01) |
| *B63B 21/66* | (2006.01) |
| *G01V 1/18* | (2006.01) |
| *B63G 8/39* | (2006.01) |
| *G01V 1/133* | (2006.01) |
| *G01V 1/02* | (2006.01) |

(52) U.S. Cl.
CPC ............ *G01V 1/3843* (2013.01); *B63B 21/66* (2013.01); *B63G 8/39* (2013.01); *G01V 1/133* (2013.01); *G01V 1/159* (2013.01); *G01V 1/186* (2013.01); *B63B 2211/02* (2013.01); *G01V 2210/121* (2013.01); *G01V 2210/1293* (2013.01)

(58) Field of Classification Search
CPC ...... G01V 1/3843; G01V 1/133; G01V 1/159; G01V 1/186; G01V 2210/1293; G01V 2210/121; B63B 21/66; B63B 2211/02; B63G 8/39
See application file for complete search history.

(56) References Cited

U.S. PATENT DOCUMENTS

| | | | | |
|---|---|---|---|---|
| 4,463,701 A | * | 8/1984 | Pickett .................... | B63B 21/66 114/245 |
| 5,532,975 A | * | 7/1996 | Elholm ................ | G01V 1/3826 367/16 |
| 5,790,472 A | * | 8/1998 | Workman ............ | G01V 1/3826 367/19 |
| 6,590,831 B1 | * | 7/2003 | Bennett ................... | B63B 21/66 367/16 |

* cited by examiner

*Primary Examiner* — Anthony D Wiest
(74) *Attorney, Agent, or Firm* — James M. Kasischke; Michael P. Stanley

(57) ABSTRACT

A lift based acoustic source is towable in an undersea environment by a towing vessel. A controller provides a combined lift control signal and an acoustic source signal. A control cable is joined between the towing vessel and a towed depressor having an active lift control system. The combined signal is used to control the towed depressor active lift control system. The towed depressor lift fluctuates in response to the source signal to generate the undersea acoustic signal. A hydrophone or hydrophone array can be provided for measuring the generated acoustic signal for feedback and monitoring.

12 Claims, 3 Drawing Sheets

LIFT-BASED ACOUSTIC SOURCE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND

(1) Field of the Invention

The present invention is directed to an acoustic source and more particularly an acoustic source utilizing hydrodynamic forces.

(2) Description of the Prior Art

A practical underwater acoustic source at low frequencies is difficult to achieve because it can get very large. Low frequencies are defined here as those below 100 Hz and more particularly, down to 4 Hz. A conventional resonant acoustic source (e.g., a Tonpilz transducer) is small compared to the wavelength that it radiates, so its effective mass m and stiffness k can be modeled as lumped elements. Conventional transducers operate at or near their resonant frequency, i.e., $\omega=2\pi f=\sqrt{k/m}$ for efficient operation, where $\omega$ is the angular frequency and f is the frequency. The resonant frequency can be reduced by lowering k or increasing m, or by some combination of these. Lowering k usually involves increasing the effective length scale, and increasing m increases the weight.

Although a moving coil source (similar to that used to drive loudspeakers in air) can in principle transmit acoustic energy at any frequency or bandwidth (in response to an input signal), its non-resonant nature makes it less efficient than a resonant source, limiting its applicability.

In oil exploration and active sonar, it is common to tow a single or multi-line hydrophone array. In oil exploration, acoustic impulses containing significant low-frequency energy are used to identify structures under the ocean floor. The Navy also uses active sonar. Thus, there is a need for low frequency acoustic sources for a plurality of applications.

FIG. 1 shows a towed depressor body 10 joined to a tow cable 12 and being towed by a vessel 14. Depressors such as body 10 allow a hydrophone array 16 to be towed at a required depth with a relatively short cable 12. Depressor body 10 can also have an acoustic source 18 positioned therein. Acoustic source 18 can be in addition to hydrophone array 16 or instead of hydrophone array 16. Both hydrophone array 16 and acoustic source 18 can be in communication with vessel 14. Without a depressor, the tow depth is achieved by the weight of the tow cable and the object being towed; however, the drag on both the cable and tow object can lead to very long cables. The use of a depressor body with its downward lift force can reduce the cable length by as much as a factor of five. Towed depressor bodies can provide a significant steady-state downward lift. As an example, a prior art towed depressor body can provide a lift of 2700 pounds at 15 knots, with a wingspan of 56 inches. (A depressor is essentially an upside down wing, producing lift in the downward direction.) Furthermore, a custom-designed depressor can provide much more lift than off-the-shelf designs, if needed.

The downward force provided by depressor body 10 can be increased by altering parameters of tow body hydrodynamic surfaces such as wing 20. Depressor bodies can also have other control surfaces 22 that can be controlled by vessel 14 providing a lift control signal. The lift control signal can be communicated to depressor body 10 through cable 12. Control surfaces 22 can be used to actively control the depth of depressor body 10 in response to the lift control signal.

It is thus desirable to combine the need for low frequency acoustic sources with the availability of towed depressor bodies utilized with towed hydrophone arrays.

SUMMARY OF THE INVENTION

It is a first object of the present invention to provide a low frequency acoustic source.

Another object is to provide such a source that utilizes a minimal amount of additional hardware.

Accordingly, there is provided a lift based acoustic source that is towable in an undersea environment by a towing vessel. A controller provides a combined lift control signal and an acoustic source signal. A control cable is joined between the towing vessel and a towed depressor having an active lift control system. The combined signal is used to control the towed depressor active lift control system. The towed depressor lift fluctuates in response to the source signal to generate the undersea acoustic signal. A method for providing a lift-based acoustic source is also provided.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
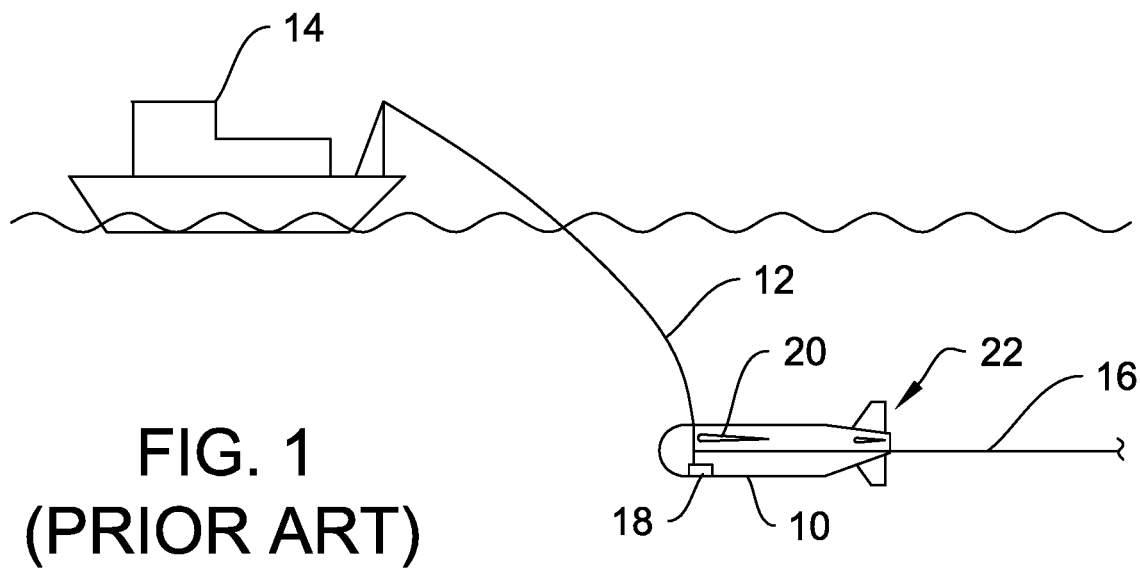
FIG. 1 is a diagram illustrating existing hardware capable of utilizing the teachings herein.
Figure 2:
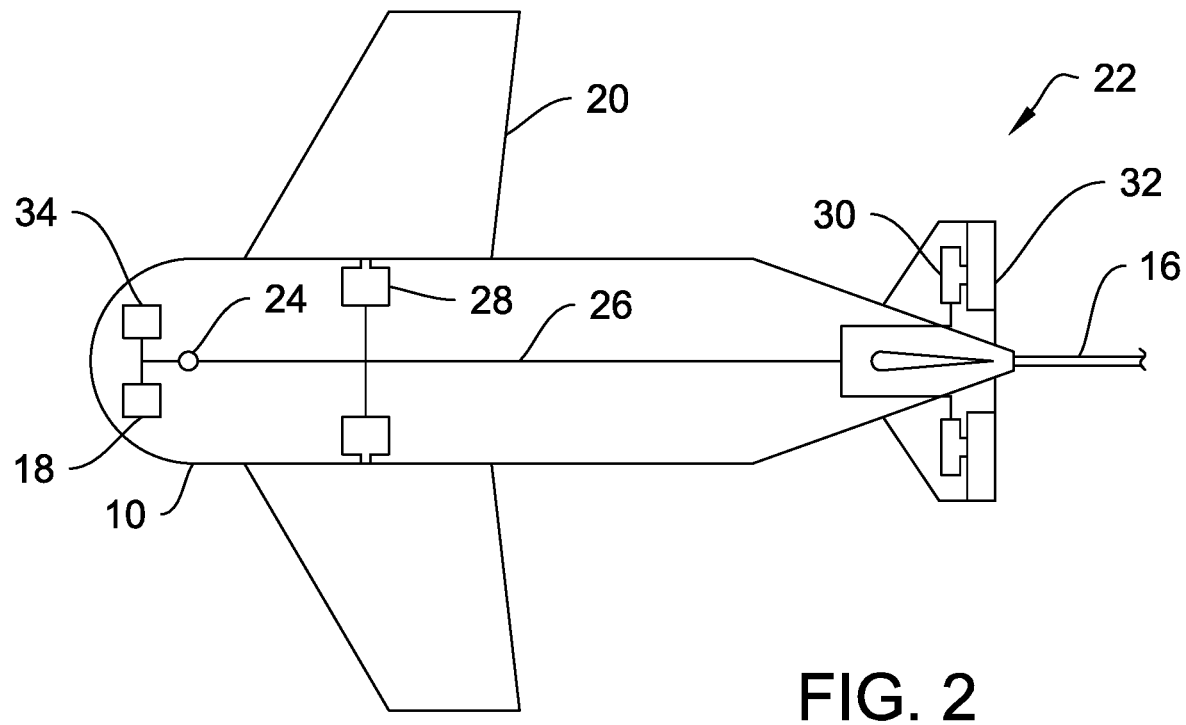
FIG. 2 is a diagram of an embodiment of a towed depressor capable of utilizing the teachings herein.

Referring to FIG. 2, there is shown an exemplary towed depressor body 10 capable of utilizing this technology. Existing towed depressor bodies can use this technology with different control structures than described herein. Body 10 can be joined to tow cable 12 (see FIG. 1) at a tow point 24. Hydrophone array 16 can be joined at a trailing portion of body 10. Body 10 has wings 20 that are primarily used to provide negative lift. Control structures 22 such as vertical and horizontal fins can be positioned on a trailing portion of body 10. Other control structures or hydrodynamic surfaces known in the art can be utilized to provide positive or negative lift.

In order to control body 10, tow cable 12 should be joined at tow point 24 to provide control signals to body 10 via control path 26. Wing actuators 28 are joined between control path 26 and wings 20 in order to change the wing 20 angle of attack in response to signals on control path 26. Aileron actuators 30 are also joined to control path 26. Aileron actuators 30 are attached to control ailerons 32 in response to signals on control path 26. Many different actuator and control structures can be utilized, and this should not be limited to the specific structure shown. For example, actuators 28 and 30 can be stepper motors, linear motors, pneumatic actuators, or hydraulic actuators.

Optionally, body 10 can have an acoustic source 18 and a depth sensor 34 in communication with tow point 24 (and tow cable 12). Acoustic source 18 is a conventional acoustic source such as piezoelectric or magneto-electric transducer known in the art. Acoustic source 18 is capable of producing conventional acoustic signals at a frequency higher than about 100 Hz. Providing an alternative acoustic source broadens the frequencies beyond that generated by the lift based acoustic source, allows transmission of a calibration signal, and provides a signal when body 10 is not moving. Depth sensor 34 can be a pressure sensor such as a depth gauge. Depth from depth sensor 34 can be communicated through tow cable 12 to a controller to aid in active control of body 10 depth through the lift control signal. Hydrophone array 16 can be joined to provide signals to systems within the tow vessel via the tow cable.

Figure 3:
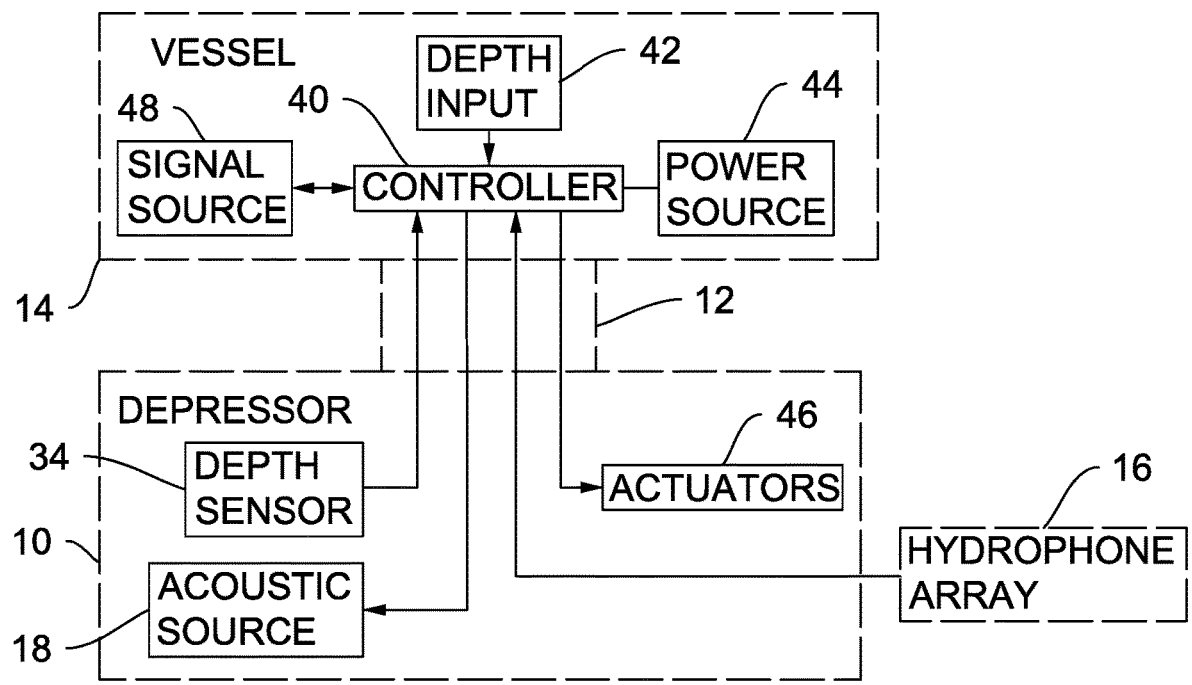
FIG. 3 is a block diagram illustrating an embodiment.

FIG. 3 provides a block diagram of control circuitry utilized in an embodiment of this invention. A controller 40 is provided on vessel 14 for providing control signals to body 10 through tow cable 12. Controller 40 receives a depth input 42 from a user or automated monitoring system. A power source 44 can be positioned on vessel 14 for powering controller 40 and actuators 46 on body 10. Alternatively, body 10 can have a battery or other means for powering actuators 46. Actuators 46 include both the wing actuators 28 and the aileron actuators 30 shown in FIG. 2. Controller 40 can provide the lift control signal as actuator control signals in response to experimentally determinations relating surface attack angle to operating depth. Optionally, body 10 can have a depth sensor 34 provided therein. Depth sensor 34 can be joined to communicate the current body 10 depth to controller 40 through tow cable 12. A feedback loop can then be utilized to actively control depth by responsively adjusting the actuator control signals.

The desired acoustic control signal originates at a signal source 48. The signal source 48 is joined to controller 40 in order to provide actuator 46 control signals that vary the wing or aileron orientation over time in response to the acoustic control signal from signal source 48. This will cause oscillation of wings 20 and/or ailerons 32 in response to the signal. Controller 40 adds this acoustic control signal oscillation to the lift control signal provided to the actuators to create a combined control signal. Hydrodynamic effects of this oscillation will generate a transient pressure which will radiate as sound. The magnitude of the transient pressure can be determined experimentally. This technique is most adaptable to low frequencies (less than about 100 Hz) where conventional sonar transmitters work poorly.

As an alternative, radiating transient pressures can be monitored by hydrophone array 16. Acoustic signals from hydrophone array 16 are provided to controller 40 through tow cable 12. Acoustic source 18 can also be monitored by hydrophone array 16. Controller 40 can provide feedback to signal source and actuators 46 responsive to the acoustic signals received from hydrophone array 16. This feedback can be utilized to modify actuator 46 control signals in order to modify the transient pressures generated by oscillation of wings 20 and/or ailerons 32. For example, amplitude of the control signal can be adjusted to provide radiated sound having greater or lesser amplitude. Frequency of the radiated sound can also be monitored and corrected.

Figure 4:
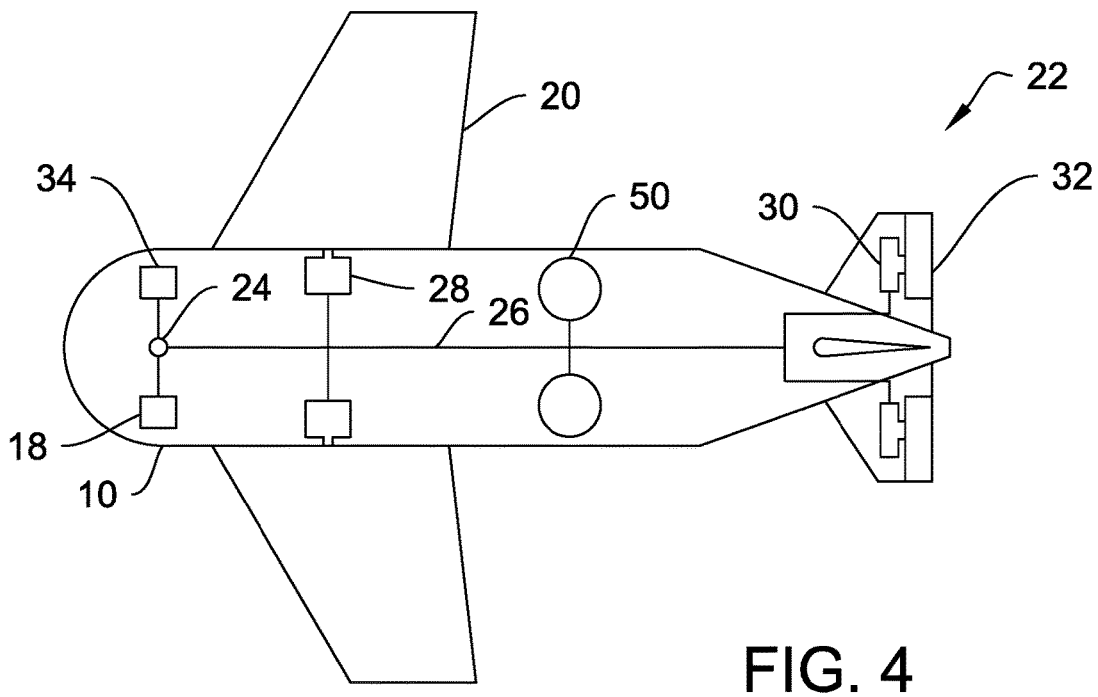
FIG. 4 is a diagram of an alternative embodiment of a towed depressor.

FIG. 4 provides an alternative embodiment of depressor. In this embodiment the depressor acts as an independent acoustic source and receiver without being joined to a hydrophone array. As before, depressor body 10 has wings 20 and control surfaces 22. Body 10 is joined to a tow vessel at a tow point 24. Signals from tow vessel are provided on control path 26. Wing actuators 28 are associated with wings 20, and aileron actuators 30 are associated with ailerons 32. Actuators 28 and 30 are responsive to control signals from tow vessel to change the angle of attack of the wings 20 and ailerons 32. This embodiment can also include a depth sensor 34 and an acoustic source 18.

Figure 5:
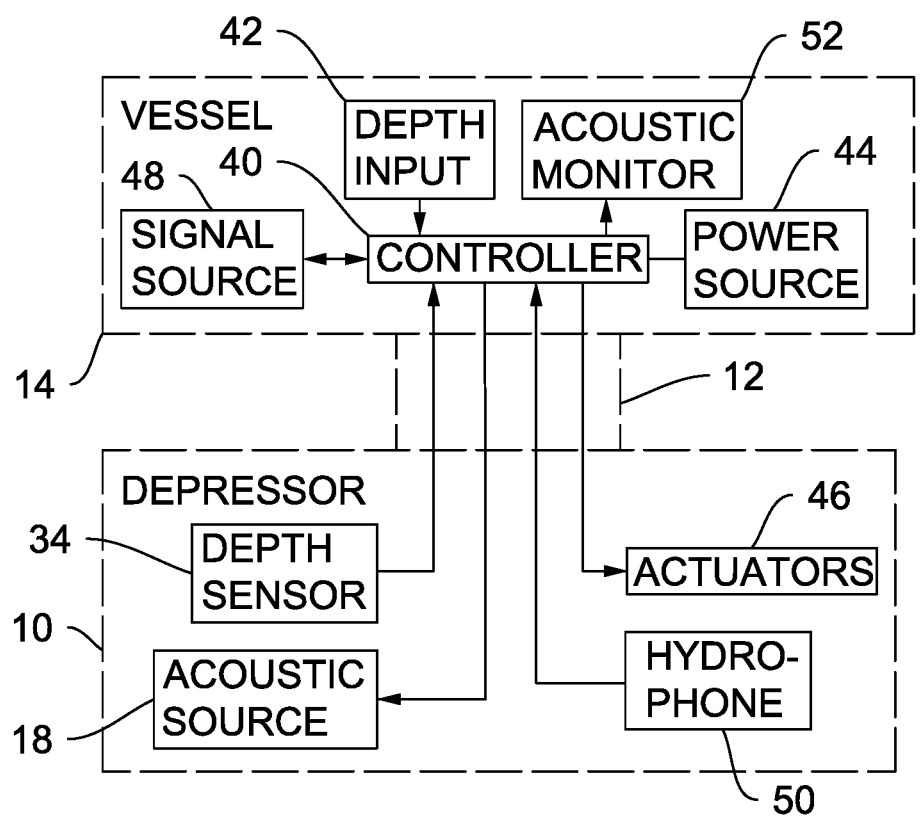
FIG. 5 is a block diagram illustrating an alternative embodiment.

FIG. 5 provides a block diagram of an alternative embodiment. Environmental acoustic signals can be received by one or more hydrophones 50 shown in the embodiment in FIG. 4 and FIG. 5. Hydrophones 50 are positioned in body 10 for receiving environmental acoustic signals.

As shown in FIG. 5, these environmental acoustic signals can be provided to tow vessel 14 through tow cable 12 to allow acoustic monitoring of the signals created by depressor body 10 and other acoustic signals. Hydrophone 50 signals are provided to controller 40 where they can be used as feedback to adjust the power level or frequency of signal source 48. The controller 40 can thus use hydrophone 50 signals to calibrate the signals to actuators 46 to optimize the radiated sound. Acoustic monitor 52 can provide a visual or auditory representation of the signals received by hydrophone 50.

Because the steady-state lift generated by depressor bodies can be very high, perturbing that lift can lead to high transient (i.e., acoustic) pressures. Furthermore, the relatively large wingspan (relative to the size of a conventional acoustic source, such as a flextensional transducer) leads to a large acoustic radiating surface. This is important because the radiated acoustic power is proportional to surface area. This source will have a dipole nature, and because of the low frequencies involved, it will be effectively a point source in the far field (because of diffraction).

This technique provides a low frequency source having advantages over previous technologies. Since underwater depressors can generate a very large lift (and have a large wing area), perturbing that lift can produce a high-intensity acoustic field. The large wing area leads to a large acoustic radiating surface (which also leads to a high-intensity acoustic field). Furthermore, some towed multifrequency sources already make use of depressor wings to shorten the tow cable length. Thus, this invention has the further advantage of utilizing existing hardware for another purpose. It also provides a multifrequency source that radiates a very low frequency acoustic signal at the same time it radiates sound at higher frequencies, increasing its effectiveness. Because the source is not derived from the resonant response of a mechanical device, it can generate a high-amplitude low-frequency signal in a small package relative to a conventional source, while not being restricted to narrowband operations.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. A lift based acoustic source towable from a vessel in an undersea environment comprising:
    a controller aboard the vessel capable of providing a lift control signal;
    a signal source joined to said controller to provide an acoustic control signal, said controller combining the acoustic control signal with the lift control signal into a combined control signal;
    a control cable joined to the controller to provide the combined control signal; and
    a towed depressor having an active lift control system joined to said control cable, said combined control signal controlling the active lift control system, whereby incorporation of the acoustic control signal with the lift control signal is capable of causing said towed depressor lift to fluctuate in response to the acoustic control signal to generate an undersea acoustic signal.

2. The apparatus of claim 1, wherein said active lift control system comprises:
    an actuator in communication with said control cable for receiving the combined control signal; and
    a hydrodynamic surface joined to said actuator, said actuator being capable of adjusting said hydrodynamic surface in response to the combined control signal.

3. The apparatus of claim 1, further comprising a towed hydrophone array joined to said towed depressor and in communication with said control cable for transmitting received undersea acoustic signals from said towed hydrophone array to said controller.

4. The apparatus of claim 3, wherein:
    said towed hydrophone array is capable of receiving undersea acoustic signals generated by fluctuating towed depressor lift; and
    said controller is capable of utilizing received undersea acoustic signals as feedback to modify the combined control signal to produce desired characteristics of the undersea acoustic signal.

5. The apparatus of claim 1, further comprising at least one hydrophone positioned on said towed depressor and in communication with said control cable for transmitting received undersea acoustic signals from said at least one hydrophone to said controller.

6. The apparatus of claim 5, wherein:
    said at least one hydrophone is capable of receiving undersea acoustic signals generated by fluctuating towed depressor lift; and
    said controller is capable of utilizing received undersea acoustic signals as feedback to modify the combined control signal to produce desired characteristics of the undersea acoustic signal.

7. The apparatus of claim 1, further comprising a depth sensor joined on said towed depressor and in communication with said control cable, said depth sensor being capable of providing a signal indicating the tow depth of said towed depressor to said controller.

8. The apparatus of claim 1, further comprising a conventional acoustic source positioned in said towed depressor and joined to said control cable for providing a conventional acoustic signal.

9. A method for generating an undersea acoustic signal comprising the steps of:
    towing a towed depressor having an active lift control system;
    providing an acoustic control signal corresponding to a desired undersea acoustic signal;
    providing a lift control signal;
    combining the acoustic control signal and the lift control signal to generate a combined control signal; and
    providing the combined control signal to the towed depressor active lift control system to actively control lift at the towed depressor whereby the actively controlled lift creates lift fluctuations at the towed depressor generating the desired undersea acoustic signal.

10. The method of claim 9, further comprising the steps of:
    obtaining a desired operating depth for the towed depressor;
    obtaining an actual operating depth at the towed depressor; and
    utilizing the desired operating depth for the towed depressor and the actual operating depth at the towed depressor to calculate the lift control signal for combination with the acoustic control signal.

11. The method of claim 9, wherein the towed depressor active lift control system includes a hydrodynamic surface on the towed depressor, and the method further comprises the step of changing the hydrodynamic properties of the hydrodynamic surface in response to the combined control signal.

12. The method of claim 9, further comprising the steps of:
    receiving undersea acoustic signals generated by lift fluctuations; and
    modifying the combined control signal utilizing received undersea acoustic signals to produce desired characteristics of the undersea acoustic signal.

* * * * *